United States Patent
Fricke et al.

(10) Patent No.: US 10,335,832 B2
(45) Date of Patent: Jul. 2, 2019

(54) APPARATUS AND METHOD FOR CLASSIFYING AND DEDUSTING GRANULAR POLYSILICON

(71) Applicant: Wacker Chemie AG, Munich (DE)

(72) Inventors: Michael Fricke, Burghausen (DE); Martin Brixel, Kirchdorf (DE); Robert Enggruber, Burghausen (DE); Rainer Hauswirth, Kirchdorf (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/566,702

(22) PCT Filed: Apr. 1, 2016

(86) PCT No.: PCT/EP2016/057246
§ 371 (c)(1),
(2) Date: Oct. 14, 2017

(87) PCT Pub. No.: WO2016/165959
PCT Pub. Date: Oct. 20, 2016

(65) Prior Publication Data
US 2018/0104720 A1    Apr. 19, 2018

(30) Foreign Application Priority Data
Apr. 16, 2015   (DE) ................. 10 2015 206 849

(51) Int. Cl.
*B07B 4/08*    (2006.01)
*B07B 11/04*   (2006.01)
(Continued)

(52) U.S. Cl.
CPC ............... *B07B 4/08* (2013.01); *B07B 11/04* (2013.01); *B07B 11/06* (2013.01); *B07B 13/16* (2013.01); *C01B 33/037* (2013.01)

(58) Field of Classification Search
CPC ............ B07B 4/08; B07B 11/04; B07B 11/06
(Continued)

(56) References Cited

U.S. PATENT DOCUMENTS 2,015,355 A * 9/1935 Snow ................. B01D 45/10
                                                  210/106
3,871,846 A * 3/1975 Berz .................. B01D 46/30
                                                   55/303
(Continued)

FOREIGN PATENT DOCUMENTS

DE    4240047 A1    6/1994
DE    9409476 U1   11/1994
(Continued)

OTHER PUBLICATIONS

PatBase abstract for DE 4240047.
PatBase abstract for DE 9409476 (Machine Translation).
Machine Translation of Abstract of DE 102010039754.

*Primary Examiner* — Terrell H Matthews
(74) *Attorney, Agent, or Firm* — Brooks Kushman P.C.

(57) ABSTRACT

Granular polysilicon is fed into a screening plant, divided into two or more fractions by means of one or more screen surfaces, and thereby classified and dedusted wherein a throwing motion of the granular polysilicon in the screening plant removes adhering dust particles from the granular polysilicon, the removed dust particles are taken off from the screening plant by means of a gas flow supplied to the screening plant, and the screening plant is of gas-tight design and supply and takeoff of the gas flow are effected such that the screening plant is at a positive pressure compared to the surroundings.

20 Claims, 3 Drawing Sheets

(51) Int. Cl.
*C01B 33/037* (2006.01)
*B07B 11/06* (2006.01)
*B07B 13/16* (2006.01)

(58) Field of Classification Search
USPC .................. 209/21, 24, 29, 32, 132, 134
See application file for complete search history.

(56) References Cited

U.S. PATENT DOCUMENTS

| | | | | |
|---|---|---|---|---|
| 4,300,921 A | * | 11/1981 | Littrell | B01D 46/30 |
| | | | | 55/291 |
| 4,452,613 A | * | 6/1984 | Littrell | B01D 46/34 |
| | | | | 34/174 |
| 4,790,865 A | * | 12/1988 | DeMarco | B01D 50/002 |
| | | | | 55/337 |
| 5,083,577 A | * | 1/1992 | Cullen | A24C 5/39 |
| | | | | 131/108 |
| 6,609,870 B2 | * | 8/2003 | Williams | B65G 53/16 |
| | | | | 141/286 |
| 7,959,008 B2 | * | 6/2011 | Von Campe | B07B 1/28 |
| | | | | 209/263 |
| 8,177,070 B2 | * | 5/2012 | Minami | B07B 4/08 |
| | | | | 209/139.1 |
| 2005/0279277 A1 | * | 12/2005 | Holder | B07B 4/04 |
| | | | | 117/19 |
| 2007/0023327 A1 | * | 2/2007 | Li | B03B 4/02 |
| | | | | 209/44 |
| 2007/0056882 A1 | * | 3/2007 | Maunder | B07B 9/00 |
| | | | | 209/233 |
| 2007/0287018 A1 | * | 12/2007 | Tutin | B32B 17/02 |
| | | | | 428/505 |
| 2008/0230446 A1 | * | 9/2008 | Bertram | A47L 9/102 |
| | | | | 209/10 |
| 2011/0198047 A1 | * | 8/2011 | Granger | D21H 27/42 |
| | | | | 162/135 |
| 2011/0212011 A1 | | 9/2011 | Chu | |
| 2012/0052297 A1 | | 3/2012 | Pech et al. | |
| 2013/0216466 A1 | * | 8/2013 | Traunspurger | H01L 21/02046 |
| | | | | 423/348 |
| 2014/0262981 A1 | * | 9/2014 | Yun | B07B 11/06 |
| | | | | 209/643 |
| 2016/0214141 A1 | * | 7/2016 | Schneider | B07B 1/00 |

FOREIGN PATENT DOCUMENTS

| | | | |
|---|---|---|---|
| DE | 102010039754 A1 | 3/2012 | |
| DE | 102013218003 * | 3/2015 | ........ B07B 1/00 |
| DE | 102013218003 A1 | 3/2015 | |
| EP | 2338835 A1 | 6/2011 | |
| EP | 2631215 A1 | 8/2013 | |
| JP | 63028181 U | 2/1988 | |
| TW | 201509548 A | 3/2015 | |
| WO | 2015032584 A1 | 3/2015 | |

* cited by examiner

APPARATUS AND METHOD FOR CLASSIFYING AND DEDUSTING GRANULAR POLYSILICON

CROSS REFERENCE TO RELATED APPLICATIONS

This application is the U.S. National Phase of PCT Appln. No. PCT/EP2016/057246 filed Apr. 1, 2016, which claims priority to German Application No. 10 2015 206 849.8 filed Apr. 16, 2015, the disclosures of which are incorporated in their entirety by reference herein.

BACKGROUND OF THE INVENTION

1. Field of the Invention

The invention provides an apparatus and a method for classifying and dedusting granular polysilicon.

2. Description of the Related Art

Granular polycrystalline silicon, or "granular polysilicon" for short, is produced in a fluidized bed reactor. This is accomplished by fluidizing silicon particles using a gas flow in a fluidized bed and heating the bed to high temperatures using a heating apparatus. Addition of a silicon-containing reaction gas brings about a pyrolysis reaction at the hot particle surface, depositing elemental silicon on the silicon particles, the individual particles increase in diameter as a result. Regular withdrawal of particles that have grown in diameter and addition of relatively small silicon particles as seed particles allows the process to be operated in continuous fashion with all the attendant advantages thereof. Silicon-containing reactant gases that may be used are silicon-halogen compounds (for example chlorosilanes or bromosilanes), monosilane ($SiH_4$) and mixtures of these gases with hydrogen.

Once produced, the granular polysilicon is typically divided into two or more fractions or classes by means of a screening plant (classification). The smallest screen fraction (screen undersize) may subsequently be processed into seed particles in a milling plant and added to the reactor. The screen target fraction is typically packed and transported to the customer. The customer uses the granular polysilicon inter alia for growing single crystals according to the Czochralski process (Cz process).

Classification employs screening machines. A screening machine is in general terms a machine for screening, i.e. for separating solid mixtures according to particle size. A distinction is made in terms of motion characteristics between planar vibratory screening machines and shaker screening machines. The screening machines are usually driven by electromagnetic means or by imbalance motors or drives. The motion of the screen tray conveys the material charged to the screen in a longitudinal direction, and facilitates passage of the fines fraction through the mesh apertures. In contrast to planar vibratory screening machines, shaker screening machines effect vertical as well as horizontal screen acceleration.

In shaker screening machines, a vertical throwing motion is combined with a gentle rotary motion. This has the effect that the sample material becomes distributed over the entire area of the screen tray while the particles simultaneously experience vertical acceleration (are thrown upward). The particles can perform free rotations in the air and upon falling back down onto the screen are confronted with the mesh of the screen fabric. If the particles are smaller than the mesh they pass through the screen and if they are larger they are thrown upward again. The rotary motion ensures that the particles will have a different orientation the next time they hit the screen fabric and thus will perhaps pass through a mesh aperture after all.

In planar screening machines the screening tower performs a horizontal circling motion in a plane. As a result, the particles for the most part retain their orientation on the screen fabric. Planar screening machines are preferably used for acicular, platelet-shaped, elongate or fibrous screened material where throwing the sample material upward is not necessarily advantageous. One specific type is a multideck screening machine which can simultaneously fractionate several particle sizes. These are designed for a multiplicity of sharp separations in the medium to ultrafine particle size range. The drive principle in multideck planar screening machines is based on two imbalance motors running in opposite directions to generate a linear vibration. The screened material moves in a straight line over the horizontal separation surface. The machine operates with low vibratory acceleration. A building block system may be used to assemble a multiplicity of screen decks into a screen stack. Thus different particle sizes can be produced in a single machine when required without needing to change screen trays. Through multiple repetition of identical screen deck sequences, it is possible to make a large screen area available to the screened material.

U.S. Pat. No. 7,959,008 B2 claims a method for screening first particles out of a granulate comprising first and second particles by conveying the granulate along a first screen surface, wherein the granulate is conveyed along the screen surface between the surface and a cover which extends along the screen surface, and the cover causes the first particles to be aligned with their longitudinal axes extending along the screen surface, wherein the longitudinal extension of each first particle is greater than the mesh width of the screen which forms the first screen surface, and the longitudinal extension of the second particles is equal to or smaller than the mesh width. The method provides for removing dust particles in an upstream screening stage. Loosely adhering micrometer-sized dust particles are detached by the throwing motion and taken off from the screening plant via a suction removal means above and/or below the screen deck.

US 2012/0052297 A1 discloses a method for dedusting polycrystalline silicon present in the form of granulate or in the form of rods, rod pieces or chunks, using compressed air or dry ice without any wet chemical treatment for the removal of silicon dust from the polycrystalline silicon.

US 2014/0262981 A1 describes an apparatus and a method for dedusting granular polysilicon. Here, the granular polysilicon falls onto a conical distributor disposed in a cylindrically shaped, lined container, thus redirecting the granular polysilicon into a radially outward motion. Positioned below the conical distributor are nozzles from which an inert gas is injected into the container to discharge the released dust in countercurrent to the inflowing granular polysilicon via a separate connection. To further aid discharging, a vacuum may be applied to the discharge stub.

U.S. Pat. No. 6,609,870 B2 describes a pneumatic conveying system for granular polysilicon which comprises a dedusting apparatus. In this system granular polysilicon is conveyed vertically upward from a first container into a second container via a pipe by pneumatic means. In this second container the granular polysilicon is conveyed by gravity into a collection container via guide plates. The contact with the guide plates causes dust to be mobilized from the granular polysilicon and removed by suction via the superimposed gas stream.

It is known that granular polycrystalline silicon exhibits surfacially adhering dust particles. The adhering dust particles are generally particles of less than 10 µm in size. These adhering dust particles are either the abovementioned process-generated silicon particles, plastics or metal attritus from solids transport or any organic/inorganic particles from the environment.

These dust particles have a deleterious effect on further processing since they float during melting and can thus lead to sticking problems during CZ pulling. Pipes and fittings further suffer fouling due to such dust particles. Dust particles are moreover potential contamination carriers on account of their large specific surface area.

There is therefore a need to remove these dust particles.

The prior art achieves mobilization of the surfacially adhering dust particles either through impact effects at surfaces provided therefor in individual apparatuses or by motion during the screening process. The mobilized dust particles are taken off from the plant via suction removal means. In some cases the removal by suction is aided by injection of a gas.

It was observed that in the prior art the granular polysilicon was contaminated by the environment during dedusting. This is attributable to impurities from the environment being sucked into the screening plant.

The object to be achieved by the invention arose from the problems described.

SUMMARY OF THE INVENTION

The object of the invention is achieved by a method for classifying and dedusting granular polysilicon, wherein the granular polysilicon is fed into a screening plant, and divided into two or more fractions by means of one or more screen surfaces, wherein a throwing motion of the granular polysilicon in the screening plant removes adhering dust particles from the granular polysilicon, wherein the removed dust particles are taken off from the screening plant by means of a gas flow supplied to the screening plant, wherein the screening plant is of gas-tight design and supply and takeoff of the gas flow are effected such that the screening plant is at positive pressure compared to the surroundings.

The object is also achieved by an apparatus for classifying and dedusting granular polysilicon which comprises a screening plant with integrated dedusting of the granular polysilicon, a unit for feeding the granular polysilicon into the screening plant, one or more screen surfaces, and a discharge region for discharging dust particles by means of a gas flow introduced into the screening plant, wherein the screening plant is of gas-tight design and wherein the screening plant is at positive pressure compared to the surroundings.

DETAILED DESCRIPTION OF THE PREFERRED EMBODIMENTS

Figure 1:
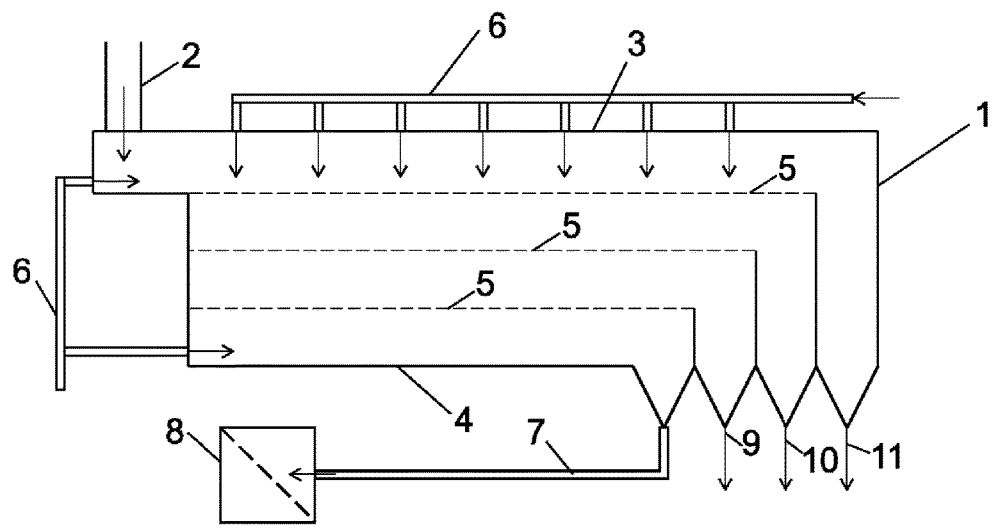
FIG. 1 shows one embodiment of an apparatus for classifying and dedusting granular polysilicon.
Figure 2:
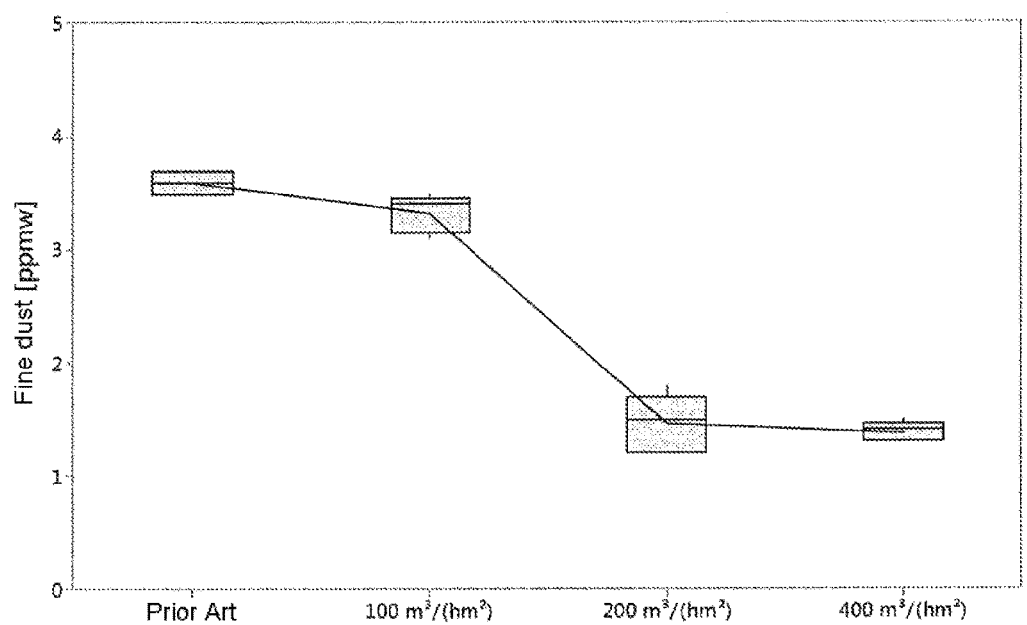
FIG. 2 shows the fine dust concentrations of granular polysilicon classified and dedusted in accordance with the prior art (comparative example) and for three exemplary embodiments of the invention (inventive classifying and dedusting).
Figure 3:
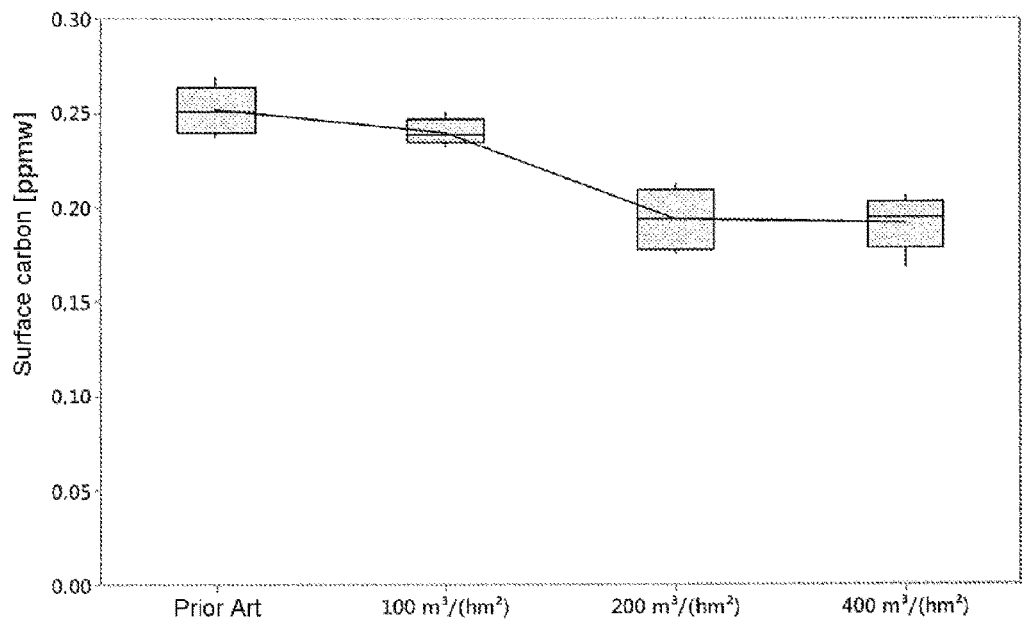
FIG. 3 shows the surfacial carbon concentrations on granular polysilicon classified and dedusted in accordance with the prior art (comparative example) and for three exemplary embodiments of the invention (inventive classifying and dedusting).
Figure 4:
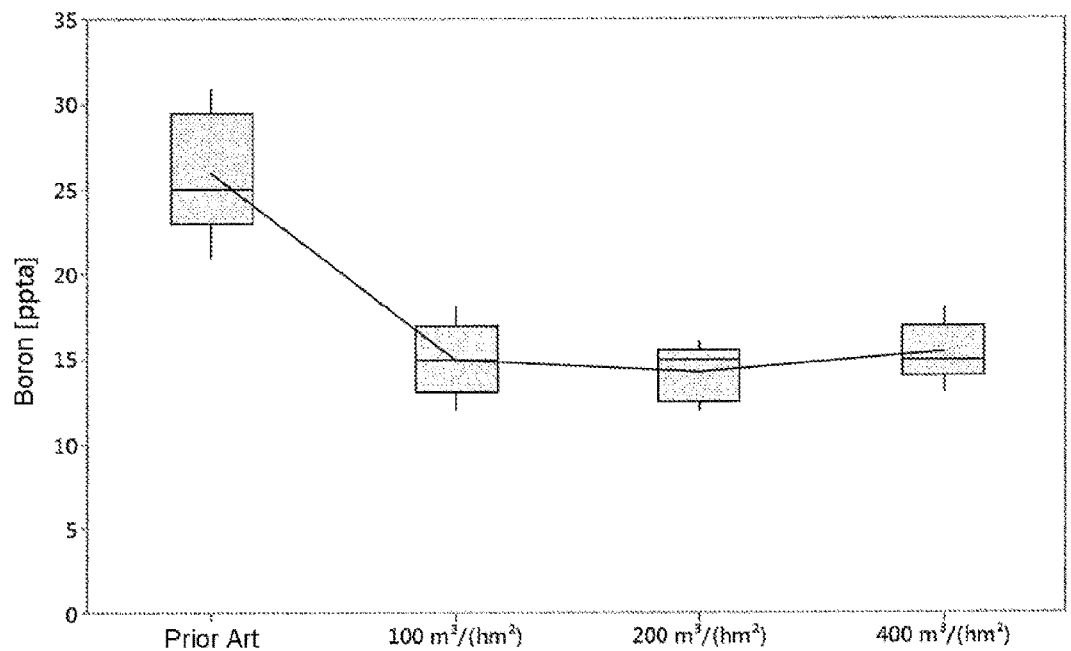
FIG. 4 shows the boron concentrations of granular polysilicon classified and dedusted in accordance with the prior art (comparative example) and for three exemplary embodiments of the invention (inventive classifying and dedusting).
Figure 5:
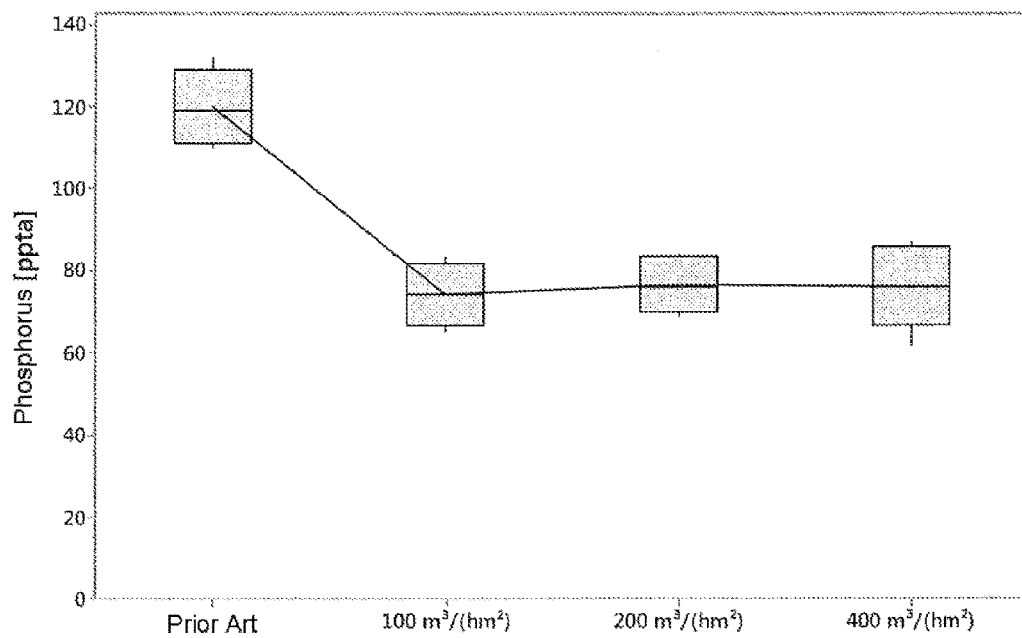
FIG. 5 shows the phosphorus concentrations of granular polysilicon classified and dedusted in accordance with the prior art (comparative example) and for three exemplary embodiments of the invention (inventive classifying and dedusting).
Figure 6:
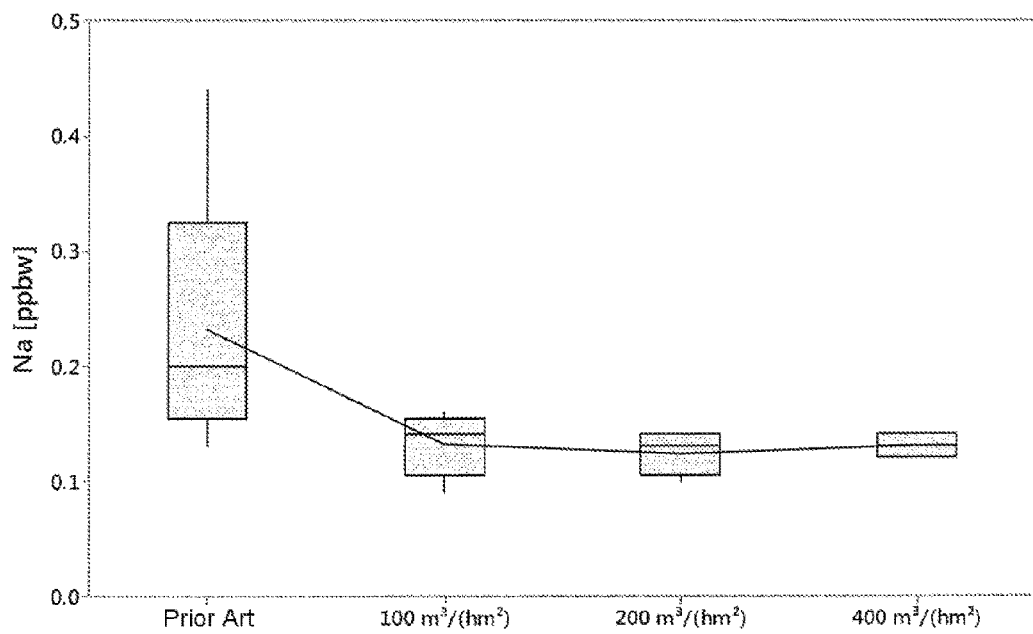
FIG. 6 shows the sodium concentrations of granular polysilicon classified and dedusted in accordance with the prior art (comparative example) and for three exemplary embodiments of the invention (inventive classifying and dedusting).

The method provides that the adhering dust particles detach from the granular polysilicon on account of a throwing motion on screen surfaces of a screening plant.

The screening plant is of gas-tight design. The screening plant preferably comprises a lid and a bottom. It is preferable when uniform injection of a gas stream is effected at the lid of the screening plant during the screening process, thereby transporting the dust particles in cocurrent with the particle flux to a discharge at the bottom of the screening plant. The dust particles are removed as a separate fraction at the bottom of the screening plant.

In order to exclude the influence of the surroundings during dedusting, the dedusting in the screening plant is carried out under positive pressure as compared to the surroundings.

In order to ensure that a constant positive pressure is applied to the screening plant, supply and takeoff of the gas is preferably controlled via a closed-loop control circuit. In the prior art, removal of dust by suction resulted in a negative pressure compared to the surroundings being established in the screen trough. Any slight leaks in the plant or a plant setup allowing gas exchange with the surroundings allowed impurities from the environment to be sucked into the plant, these impurities causing surfacial contamination of the granular polysilicon.

Combining the features "gas-tight design of the screening plant" and "operation at positive pressure compared to the surroundings" in the present invention makes it possible to avoid this.

The gas flow facilitates evacuation of the dust particles but not detachment of the dust particles from the granular polysilicon. Detachment of the dust particles is accomplished by the throwing motion of the granular polysilicon in the screening plant and by impact effects during the task.

The gas flow is provided in cocurrent with the particle flux.

In one embodiment the unit for feeding the granular polysilicon into the screening plant is a metering unit.

It is preferable when gas is injected in the unit for feeding the granular polysilicon, preferably in a metering unit, and via the lid of the screening plant.

In order to ensure uniform introduction of the gas into the screening plant and to avoid a free jet into the screening plant the gas is preferably uniformly introduced via filtration mats (microporous plastics bodies) disposed at the lid of the screening plant. Injection via conventional nozzles is likewise possible.

The number of gas feed points through the filtration mats at the lid of the screening plant may be varied as desired provided that placement of the connections at the lid of the screening plant is technically feasible in terms of installation. A preferred number of gas feed points is 1 to 50 feed points at the lid per m² of screen area, more preferably 30 to 40 feed points at the lid per m² of screen area.

In terms of gas supply to the filtration mats, either every feed point is supplied and controlled with a dedicated gas stream or feed points are supplied and controlled collectively in groups of, for example, up to 10 feed points. When a group of a plurality of feed points is supplied with gas together, the gas feed should have a cross-sectional narrowing (for example via perforated plates or via de Laval nozzles) upstream of it in order that equal volume flow rates are achieved at the feed points.

To further aid discharging of the dust particles, gas is injected in the direction of the discharge at the bottom of the screening plant.

The smallest product fraction of the screened material is separated from the dust fraction by a last screening stage and the dust is therefore discharged via the bottom of the screening plant via a dedicated outlet.

The different feed points for the gas result in an optimal flow profile in the screening plant to achieve the best possible pneumatic discharging of the dust particles from the screening plant.

For further dedusting of the product, fractions are preferably additionally subjected to a countercurrent flow of a gas in the respective discharge conduit. The dust-particle-laden gas streams of the respective discharge conduits are combined with the discharge conduit for the dust from the screening plant.

The volume flow rate of the dust-particle-laden offgas stream is controlled such that a positive pressure compared to the surroundings is established in the screening plant. This control moreover ensures that no dust particles are blown back into the screening plant by the countercurrent dedusting below the screening plant.

The average gas velocity in the screening plant should be from 0.1 to 0.4 m/s, more preferably from 0.2 to 0.3 m/s. The average gas velocities may be calculated from the supplied and measurable gas volume flow rate.

An average gas velocity of 0.2 m/s may be established, for example, with a screen-area-based gas throughput under standard conditions of about 200 m³/(h m²).

The screening plant should be at a positive pressure compared to the surroundings of from 5 to 50 mbar, preferably 10 to 20 mbar.

After exiting the screening plant the dust particles are preferably conveyed by pneumatic means. This may be achieved by supplying gas to the discharge conduit via a gas feeding unit (by a similar principle as for a Venturi nozzle).

It is preferable when the fine dust is removed from the taken-off gas stream via a filtering unit. The purified gas may then either be released to the environment as offgas or fed back into the gas supply and recirculated. Suitable gases include purified air, nitrogen or other inert gases.

To avoid gas losses, a reduction in the oxygen content and an elevated particle concentration due to escaping dust, the screening plant according to the invention must moreover be constructed such that the injected gas cannot escape into the workspace around the screening plant.

If leaks in the screening plant nevertheless occur, the operating mode employing positive pressure compared to the surroundings ensures that no external impurities can get into the screening plant. This operating mode precludes the risk of surfacial impurification by the environment.

A constant positive pressure in the plant compared to the surroundings is ensured by taking pressure measurements in the screening plant and controlling supply and takeoff of the dedusting gas accordingly.

The features cited in connection with the abovedescribed embodiments of the method according to the invention may be correspondingly applied to the apparatus according to the invention. Conversely, the features cited in connection with the abovedescribed embodiments of the apparatus according to the invention may be correspondingly applied to the method according to the invention. These and other features of the embodiments according to the invention are elucidated in the description of the figures and in the claims. The individual features may be realized either separately or in combination as embodiments of the invention. Said features may further describe advantageous implementations eligible for protection in their own right.

LIST OF REFERENCE NUMERALS EMPLOYED 1 screening plant
2 product feed
3 screening plant lid
4 screening plant bottom
5 screen surface/screen deck
6 gas supply
7 gas takeoff laden with dust particles
8 filter for dust particles
9 undersize discharge fraction
10 target size discharge fraction
11 oversize discharge fraction FIG. 1 shows the schematic construction of an apparatus for classifying and dedusting granular polysilicon.

The screening plant 1 comprises a lid 3 and a bottom 4. The granular polysilicon to be classified and dedusted is introduced by means of product feed 2. Screen surfaces/screen decks 5 are provided for classification. Gas is injected via gas supply 6. The dust-particle-laden gas is taken off from the screening plant 1 via gas takeoff 7. A filter 8 for dust particles is provided with which fine dust may be removed from the take-off gas stream. The granular polysilicon in these examples, is classified into three fractions (undersize, target size, oversize). Discharges 9, 10, 11 are provided for these three fractions.

COMPARATIVE EXAMPLE AND EXAMPLES

In the comparative example and the inventive examples, the concentrations of fine dust, surface carbon, boron, phosphorus and sodium on granular polysilicon classified and dedusted in different ways were determined.

The carbon concentration at the surface was determined by the so-called LECO method which is described in detail in US 2013/0216466 A1.

Boron and phosphorus were determined according to SEMI MF 1398 on monocrystalline samples of an FZ single crystal produced from the polycrystalline material (SEMI MF 1723) by photoluminescence.

The metal concentrations (sodium) were determined as per ASTM 1724-01 by ICP-MS (inductively coupled plasma mass spectrometry).

The fine dust was washed off as per the procedure in DE 10 2010 039754 A1. The fine dust content is not measured with a particle sizer but rather the dust content is determined by photometric means by UV/Vis spectroscopy. UV/Vis spectroscopy is a type of spectroscopy utilizing the electromagnetic waves of ultraviolet (UV) and visible (Vis) light.

Comparative Example (Noninventive)

The comparative example employed a prior art screening plant (see WO 2015/032584 A1) where the dust was removed by suction from the screening region. However, the screening plant was not outwardly sealed. The removal by suction of the dust and the associated aspiration of air from the surroundings allowed impurities to get onto the product surface.

Table 1 shows the results for five samples and also average values.

TABLE 1

| parameter | sample 1 | sample 2 | sample 3 | sample 4 | sample 5 | average value |
|---|---|---|---|---|---|---|
| fine dust [ppmw] | 3.5 | 3.7 | 3.5 | 3.7 | 3.6 | 3.6 |
| surface carbon [ppmw] | 0.251 | 0.269 | 0.243 | 0.26 | 0.238 | 0.2522 |
| boron [ppta] | 21 | 25 | 28 | 31 | 25 | 26 |
| phosphorus [ppta] | 110 | 126 | 119 | 132 | 112 | 119.8 |
| sodium [ppbw] | 0.21 | 0.18 | 0.44 | 0.2 | 0.13 | 0.232 |

The examples employed the inventive method/the inventive apparatus (gas-tight screening plant, operation at positive pressure compared to the surroundings). In addition, gas throughputs and thus the flow rates in the screening plant were varied.

Example 1

The supplied volume flow rate under standard conditions per unit screen area for purging was 100 m$^3$/(h m$^2$).

Table 2 shows the results for five samples and also average values.

TABLE 2

| parameter | sample 1 | sample 2 | sample 3 | sample 4 | sample 5 | average value |
|---|---|---|---|---|---|---|
| fine dust [ppmw] | 3.4 | 3.1 | 3.5 | 3.4 | 3.2 | 3.32 |
| surface carbon [ppmw] | 0.243 | 0.236 | 0.251 | 0.239 | 0.233 | 0.2404 |
| boron [ppta] | 15 | 14 | 12 | 16 | 18 | 15 |
| phosphorus [ppta] | 80 | 65 | 74 | 83 | 68 | 74 |
| sodium [ppbw] | 0.12 | 0.09 | 0.15 | 0.14 | 0.16 | 0.132 |

Example 2

The supplied volume flow rate under standard conditions per unit screen area for purging was 200 m$^3$/(h m$^2$).

Table 3 shows the results for five samples and also average values.

TABLE 3

| parameter | sample 1 | sample 2 | sample 3 | sample 4 | sample 5 | average value |
|---|---|---|---|---|---|---|
| fine dust [ppmw] | 1.2 | 1.6 | 1.5 | 1.8 | 1.2 | 1.46 |
| surface carbon [ppmw] | 0.18 | 0.206 | 0.176 | 0.194 | 0.213 | 0.1938 |
| boron [ppta] | 12 | 13 | 16 | 15 | 15 | 14.2 |
| phosphorus [ppta] | 69 | 83 | 76 | 71 | 84 | 76.6 |
| sodium [ppbw] | 0.1 | 0.14 | 0.13 | 0.11 | 0.14 | 0.124 |

Example 3

The supplied volume flow rate under standard conditions per unit screen area for purging was 400 m$^3$/(h m$^2$).

Table 4 shows the results for five samples and also average values.

TABLE 4

| parameter | sample 1 | sample 2 | sample 3 | sample 4 | sample 5 | average value |
|---|---|---|---|---|---|---|
| fine dust [ppmw] | 1.3 | 1.3 | 1.4 | 1.4 | 1.5 | 1.38 |
| surface carbon [ppmw] | 0.201 | 0.169 | 0.195 | 0.188 | 0.206 | 0.1918 |
| boron [ppta] | 15 | 16 | 13 | 15 | 18 | 15.4 |
| phosphorus [ppta] | 85 | 62 | 76 | 71 | 87 | 76.2 |
| sodium [ppbw] | 0.13 | 0.14 | 0.12 | 0.14 | 0.12 | 0.13 |

For further elucidation FIGS. 2-6 show the results of comparative example and examples 1-3 as boxplots for the parameters fine dust, surface carbon, boron, phosphorus and sodium.

It is evident from examples 1-3 that the method according to the invention results in an improvement in dedusting.

It is moreover apparent that increasing the gas stream registers a further improvement in dedusting performance.

No further improvement is possible above a particular purge volume flow rate.

In the examples shown, no further reduction in the fine dust content is measurable between the volume flow rates under standard conditions per unit screen area of 200 m$^3$/(h m$^2$) and 400 ms/(h m$^2$). This behavior indicates that the dust is mobilized by the screen motion.

It is preferable to choose a minimum gas amount of 200 m$^3$/(h m$^2$) in order to discharge the mobilized dust from the screening region as well and thus avoid back contamination.

The surface carbon adhering surfacially to the granular polysilicon and also to the silicon dust particles in the form of plastics residues exhibits behavior similar to that observed for the fine dust. Discharge of the dust particles simultaneously also effects discharge of some of the plastics attritus.

An improvement for the elements boron and phosphorus was achieved by means of the gas-tight operating mode under positive pressure compared to the surroundings. For these elements that are introduced via the environment, the purge gas amount is essentially immaterial since the gas-tight design and the positive pressure operating mode are responsible for the effect.

For the element Na which can typically get onto the granular polysilicon via the environment, the gas-tight design of the screening plant with positive pressure compared to the surroundings likewise prevented ingress into the plant. As a result, similarly to phosphorus and boron, a reduction of the value compared to the comparative example was achieved.

The description hereinabove of illustrative embodiments is to be understood as being exemplary. The disclosure made thereby enables a person skilled in the art to understand the present invention and the advantages associated therewith and also encompasses alterations and modifications to the described structures and methods obvious to a person skilled in the art. All such alterations and modifications and also equivalents shall therefore be covered by the scope of protection of the claims.

The invention claimed is:

1. A method for classifying and dedusting granular polysilicon, comprising:
feeding granular polysilicon into a screening plant, screening the granular polysilicon into two or more fractions of different sizes by means of one or more screen surfaces of a screening plant, wherein a throwing motion of the granular polysilicon in the screening plant removes adhering dust particles from the granular polysilicon, and withdrawing the removed dust particles from the screening plant by means of a gas flow supplied to the screening plant, wherein the screening plant is of gas-tight design, and supply and takeoff of gas are effected such that the screening plant is at a positive pressure compared to the pressure of the surroundings, the screening plant comprising a lid and a bottom, and wherein injection of a gas stream is effected at the lid of the screening plant during the screening process, thereby transporting the dust particles in cocurrent flow with the granular polysilicon to a discharge at the bottom of the screening plant, removing the dust particles at the bottom of the screening plant, and collecting at least one fraction of granular polysilicon.

2. The method of claim 1, wherein a constant positive pressure compared to the surroundings is established in the screening plant by a control unit.

3. The method of claim 1, wherein the granular polysilicon is fed into the screening plant by means of a metering unit.

4. The method of claim 2, wherein the granular polysilicon is fed into the screening plant by means of a metering unit.

5. The method of claim 1, wherein the gas is passed into the screening plant via one or more filtration mats.

6. The method of claim 2, wherein the gas is passed into the screening plant via one or more filtration mats.

7. The method of claim 3, wherein the gas is passed into the screening plant via one or more filtration mats.

8. The method of claim 1, wherein the average gas velocity in the screening plant is from 0.1 to 0.4 m/s.

9. The method of claim 5, wherein the average gas velocity in the screening plant is from 0.1 to 0.4 m/s.

10. The method of claim 1, wherein the screening plant is at a positive pressure compared to the surroundings of from 5 to 50 mbar.

11. The method of claim 5, wherein the screening plant is at a positive pressure compared to the surroundings of from 5 to 50 mbar.

12. The method of claim 8, wherein the screening plant is at a positive pressure compared to the surroundings of from 5 to 50 mbar.

13. The method of claim 1, wherein the volume flow rate of the gas flow, supplied under standard conditions to the screening plant, is at least 100 m$^3$/(h m$^2$).

14. An apparatus for classifying and dedusting granular polysilicon by the method of claim 1, employing a screening plant with integrated dedusting of the granular polysilicon, comprising:
a granular polysilicon feed unit, one or more screen surfaces having a throwing motion which classify the granular polysilicon into at least one polysilicon fraction, a discharge region for discharging dust particles by means of a gas flow introduced into the screening plant, wherein the screening plant is gas-tight and comprises a lid having gas inlets and a bottom such that the screening plant operates at a positive pressure compared to the surroundings and gas inlets at the lid inject gas at the lid of the screening plant during a screening process, thereby transporting the dust particles in cocurrent flow with the polysilicon fractions to a discharge at the bottom of the screening plant and into a collector for dust particles at the bottom of the screening plant which is separate from collectors for polysilicon fractions.

15. The method of claim 1, wherein the throwing motion is imparted to polysilicon granules by a vertical motion of a screen surface.

16. The method of claim 1, wherein at least one undersize fraction of granular polysilicon, one target size fraction of granular polysilicon, and one oversize fraction of granular polysilicon are collected, in addition to dust particles.

17. The method of claim 1, wherein the dust particles have a mean size of <10 μm.

18. The method of claim 1, wherein the granular polysilicon fractions collected have reduced contents of C, B, P, and Na compared to fractions collected where the screening plant is not operated at a positive pressure.

19. The method of claim 1, wherein the gas flow in the screening plan is greater than 200 m$^3$/(h m$^2$).

20. The method of claim 1, wherein dust and at least two fractions of granular polysilicon are collected.

* * * * *